(12) United States Patent
Lin

(10) Patent No.: US 12,289,738 B2
(45) Date of Patent: Apr. 29, 2025

(54) APPARATUS AND METHOD OF COMMUNICATION OF SAME

(71) Applicant: GUANGDONG OPPO MOBILE TELECOMMUNICATIONS CORP., LTD., Guangdong (CN)

(72) Inventor: Hao Lin, Neuilly-sur-seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 368 days.

(21) Appl. No.: 17/943,324

(22) Filed: Sep. 13, 2022

(65) Prior Publication Data

US 2023/0023518 A1 Jan. 26, 2023

Related U.S. Application Data

(63) Continuation of application No. PCT/IB2020/000535, filed on May 26, 2020.

(30) Foreign Application Priority Data

Mar. 13, 2020 (WO) .................. PCT/IB2020/000459
May 11, 2020 (WO) .................. PCT/IB2020/000789

(51) Int. Cl.
  *H04W 72/04* (2023.01)
  *H04L 27/26* (2006.01)
  *H04W 72/0453* (2023.01)
  *H04W 72/23* (2023.01)

(52) U.S. Cl.
  CPC ....... *H04W 72/23* (2023.01); *H04L 27/26025* (2021.01); *H04W 72/0453* (2013.01)

(58) Field of Classification Search
  CPC .............. H04W 72/23; H04W 72/0453; H04L 27/26025
  See application file for complete search history.

(56) References Cited

U.S. PATENT DOCUMENTS

| | | | |
|---|---|---|---|
| 10,568,081 B2* | 2/2020 | Papasakellariou | H04W 52/325 |
| 10,959,259 B2* | 3/2021 | Bhattad | H04L 1/1896 |
| 11,412,544 B2* | 8/2022 | Li | H04L 5/006 |
| 2011/0032889 A1 | 2/2011 | Lee | |
| 2012/0287865 A1 | 11/2012 | Wu | |

(Continued)

FOREIGN PATENT DOCUMENTS

| | | |
|---|---|---|
| EP | 3407653 A1 | 11/2018 |
| EP | 3611866 A1 | 2/2020 |

(Continued)

OTHER PUBLICATIONS

Second Office Action of the European application No. 20745264.0, issued on Apr. 26, 2024. 8 pages.

(Continued)

*Primary Examiner* — Bailor C Hsu
(74) *Attorney, Agent, or Firm* — PERKINS COIE LLP

(57) ABSTRACT

A method of communication of a user equipment (UE) includes receiving, by the UE, a first information, and the first information is relevant to an uplink resource allocation. This provides a method of uplink resource allocation and may further provide an indication field to include a resource selection indication. A user equipment and a base station are also provided.

12 Claims, 19 Drawing Sheets

(56) References Cited

U.S. PATENT DOCUMENTS

| | | | |
|---|---|---|---|
| 2013/0294368 A1 | 11/2013 | Bendlin et al. | |
| 2016/0057743 A1 | 2/2016 | Aiba et al. | |
| 2016/0165575 A1 | 6/2016 | Park et al. | |
| 2019/0037555 A1 | 1/2019 | Kim et al. | |
| 2019/0082431 A1* | 3/2019 | Yi | H04L 5/0055 |
| 2019/0342911 A1* | 11/2019 | Talarico | H04L 5/0098 |
| 2020/0021410 A1 | 1/2020 | Choi et al. | |
| 2020/0022144 A1 | 1/2020 | Papasakellariou | |
| 2020/0045681 A1 | 2/2020 | Bendlin et al. | |
| 2020/0137731 A1 | 4/2020 | Wei | |
| 2020/0314837 A1* | 10/2020 | Oh | H04L 5/0094 |
| 2021/0153193 A1* | 5/2021 | Lin | H04W 56/0045 |
| 2021/0400714 A1* | 12/2021 | Huang | H04W 72/23 |
| 2022/0022256 A1* | 1/2022 | Li | H04L 5/0094 |
| 2022/0060999 A1* | 2/2022 | Oh | H04W 52/383 |
| 2022/0312444 A1* | 9/2022 | He | H04W 74/0833 |

FOREIGN PATENT DOCUMENTS

| | | |
|---|---|---|
| WO | 2009038300 A1 | 3/2009 |
| WO | 2012152917 A1 | 11/2012 |
| WO | 2016089729 A2 | 6/2016 |
| WO | 2018038758 A1 | 3/2018 |
| WO | 2019029614 A1 | 2/2019 |
| WO | 2019158686 A1 | 8/2019 |
| WO | 2020017434 A1 | 1/2020 |
| WO | 2020017525 A1 | 1/2020 |
| WO | 2020032700 A1 | 2/2020 |

OTHER PUBLICATIONS

VIVO: "Remaining issues on physical UL channel design in unlicensed spectrum", 3GPP Draft; R1-2000308, 3rd Generation Partnership Project (3GPP), Mobile Competence Centre; 650, Route Des Lucioles; F-06921 Sophia-Antipolis Cedex; France, vol. RAN WG1, No. e-meeting; Feb. 24-Mar. 6, 2020 Feb. 14, 2020 (Feb. 14, 2020), XP051852797. the whole document, 9 pages.

MCC Support: "Draft Report of 3GPP TSG RAN WG1 #99 v0.1.0 (Reno USA, Nov. 18-22, 2019)", 3GPP Draft; DRAFT_MINUTES_REPORT_RAN1#99_V010, 3rd Generation Partnership Project (3GPP), Mobile Competence Centre; 650, Route Des Lucioles; F-06921 Sophia-Antipolis Cedex; France vol. RAN WG1, No. Athens, Greece; Feb. 24-Feb. 28, 2020 Nov. 27, 2019 (Nov. 27, 2019), XP051831467. the whole document, 153 pages.

Office Action of the Indian application No. 202227056794, issued on Feb. 16, 2023. 6 pages with English translation.

International Search Report in the international application No. PCT/IB2020/000535, mailed on Nov. 20, 2020.

Written Opinion of the International Search Authority in the international application No. PCT/IB2020/000535, mailed on May 26, 2020.

MCC Support, "Final Report of 3GPP TSG RAN WG1 #94bis v1.1.0(Chengdu, China, Oct. 8-12, 2018)", 3GPP TSG RAN WG1 Meeting #95 R1-1813901, Spokane, USA, Nov. 12-16, 2018.

International Search Report in the international application No. PCT/IB2020/000459, mailed on Nov. 13, 2020.

Written Opinion of the International Search Authority in the international application No. PCT/IB2020/000459, mailed on Mar. 13, 2020.

International Search Report in the international application No. PCT/IB2020/000789, mailed on Feb. 12, 2021.

Written Opinion of the International Search Authority in the international application No. PCT/IB2020/000789, mailed on May 11, 2021.

First Office Action of the Canadian application No. 3171457, issued on Nov. 14, 2023. 4 pages.

First Office Action of the European application No. 20745264.0, issued on Nov. 24, 2023. 7 pages.

Ericsson: "UL signals and channels for NR-U", 3GPP Draft; R1-1912708, 3rd Generation Partnership Project (3GPP), Mobile Competence Centre; 650, Route Des Lucioles; F-06921 Sophiaantipoliscedex; France, vol. RAN WG1, No. Reno, NV, USA; Nov. 18, 2019-Nov. 22, 2019, Nov. 9, 2019 (Nov. 9, 2019), XP051823552, pp. 1-24.

MCC Support: "Final Report of 3GPP TSG RAN WG1 #98 v2.0.0(Prague, Czech Rep, Aug. 26-30, 2019)", R1-1911429, 3GPP Draft; FINAL_MINUTES_REPORT_RAN1#98_V200, 3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14, 2019-Oct. 18, 2019 Oct. 12, 2019(Oct. 12, 2019), XP051788776, pp. 46-50, pp. 53-56 and pp. 109-110.

Fourth Office Action of the European application No. 20745264.0, issued on Jan. 24, 2025, 9 pages.

* cited by examiner

APPARATUS AND METHOD OF COMMUNICATION OF SAME

CROSS-REFERENCE TO RELATED APPLICATIONS

This application is a continuation of International Application No. PCT/IB2022/000535 filed on May 26, 2020, which claims priorities to International Application No. PCT/IB2020/000459, filed on Mar. 13, 2020, and International Application No. PCT/IB2020/000789, filed on May 11, 2020. The contents of these applications are incorporated herein by reference in their entireties.

BACKGROUND OF DISCLOSURE

In an unlicensed band, an unlicensed spectrum is a shared spectrum. Communication equipments in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

On an unlicensed carrier, for a channel occupation time obtained by a base station, it may share the channel occupation time to a user equipment (UE) for transmitting an uplink signal or an uplink channel. In other words, when the base station shares its own channel occupancy time with the UE, the UE can use an LBT mode with higher priority than that used by the UE itself to obtain the channel, thereby obtaining the channel with greater probability.

In new radio-based access to unlicensed spectrum (NRU), a wideband operation can be configured and a configured active bandwidth part (BWP) can include resource block sets (RB sets). Physical uplink control channel (PUCCH) resource allocation in terms of an RB set and an interlace is not fully designed and is still an open issue.

In addition, in an NRU wideband operation, a BS (such as gNB) and a UE can operate in a wider band including RB sets. NR release 15 has defined a BWP concept, thus in a context of the NRU wideband operation, the UE can be configured with an active BWP including multiple RB sets. Multiple RB sets can be assigned by the gNB to the UE for uplink transmission, e.g. a physical uplink control channel (PUCCH) transmission. However, by regulation, priori to each transmission in the spectrum, a sender needs to perform the LBT procedure. This implies that for transmissions of multiple RB sets, multi-RB set-based LBT has to be performed. Because an outcome of the multi-RB-set based LBT cannot be ensured, the UE or the BS cannot predict the outcome of the LBT procedure. How to design an indication field to include a resource selection indication is still an open issue.

Therefore, there is a need for an apparatus and a method of communication of the same, which can solve issues in the prior art, provide a method of uplink resource allocation, and further provide an indication field to include a resource selection indication.

SUMMARY

The present disclosure relates to the field of communication systems, and more particularly, to an apparatus and a method of communication of the same.

An object of the present disclosure is to propose an apparatus such as a user equipment (UE) and/or a base station (BS) and a method of communication of the same, which can solve issues in the prior art, provide a method of uplink resource allocation, and further provide an indication field to include a resource selection indication.

In a first aspect of the present disclosure, a method of communication of a user equipment (UE) includes receiving, by the UE, a first information, wherein the first information is relevant to an uplink resource allocation.

In a second aspect of the present disclosure, a UE includes a memory, a transceiver, and a processor coupled to the memory and the transceiver. The processor is configured to control the transceiver to receive a first information, wherein the first information is relevant to an uplink resource allocation.

In a third aspect of the present disclosure, a method of communication of a base station (BS) includes transmitting, by the BS, a first information, wherein the first information is relevant to an uplink resource allocation.

In a fourth aspect of the present disclosure, a BS includes a memory, a transceiver, and a processor coupled to the memory and the transceiver. The processor is configured to control the transceiver to transmit a first information, wherein the first information is relevant to an uplink resource allocation.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
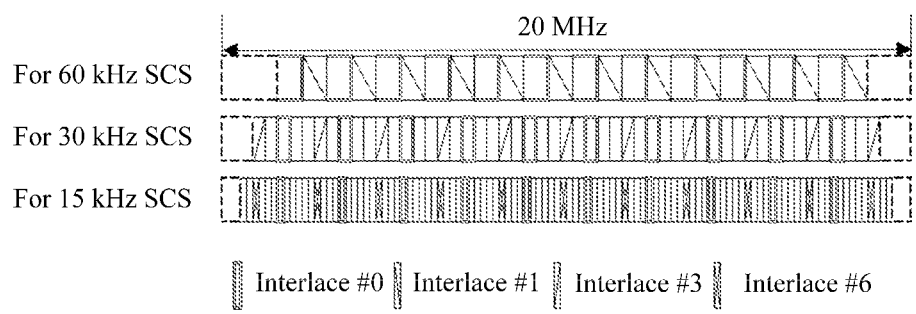
FIG. 1 is a schematic diagram illustrating an interlaced structure for an uplink channel transmission.

FIG. 1 illustrates an interlaced structure for an uplink channel transmission. In new radio-based access to unlicensed spectrum (NRU) physical uplink control channel (PUCCH) interlace, in an unlicensed band in 5G Hz, a regulation imposes that if a transmitter wants to operate transmission in a channel, the transmission has to occupy at least 80% of a channel bandwidth With this restriction, NRU decided to adopt an interlaced structure for two uplink channel transmissions, they are PUCCH and physical uplink shared channel (PUSCH). Each interlace structure will have specific number of physical resource block (PRB). Between each consecutive PRB pairs, there is M PRB further apart. For example, in a 20 MHz bandwidth and for 30 kHz subcarrier spacing (SCS) case, 1 interlace has 10 or 11 PRBs and M=5.

In Release 16, a PUSCH transmission can be configured to use an interlace structure. Moreover, an active uplink bandwidth part can contain more than one RB sets. When a downlink control information (DCI) schedules a PUSCH transmission, the DCI needs to indicate a selected interlace and a selected RB set. Moreover, for Msg3 transmission, it can be scheduled by a random access response (RAR) uplink grant. How to design an indication field to include a resource selection indication is still an open issue. Some embodiments of the present disclosure provide technical solutions to resolve this issue.

Figure 2:
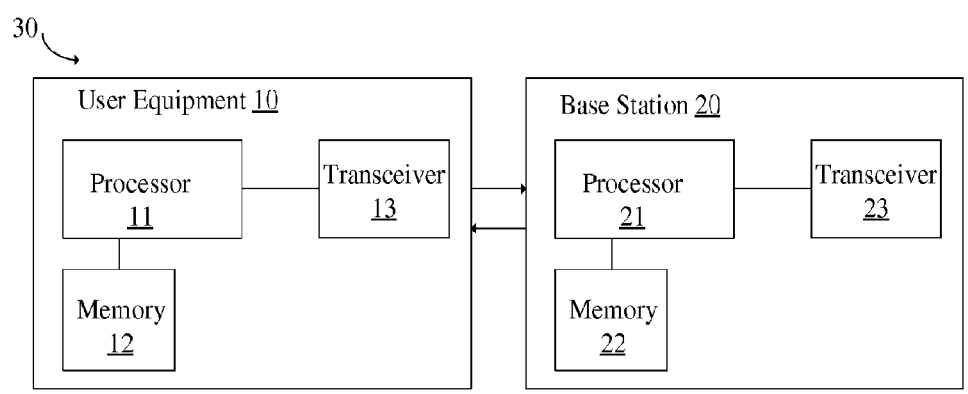
FIG. 2 is a block diagram of a user equipments (UE) and abase station (BS) (e.g., gNB) of communication in a communication network system according to an embodiment of the present disclosure.

FIG. 2 illustrates that, in some embodiments, a user equipment (UE) 10 and a base station (BS) (e.g., gNB) 20 of communication in a communication network system 30 according to an embodiment of the present disclosure are provided. The communication network system 30 includes one or more UEs 10 of a cell and the BS 20. The UE 10 may include a memory 12, a transceiver 13, and a processor 11 coupled to the memory 12, the transceiver 13. The base station 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of first information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to control the transceiver 13 to receive a first information, wherein the first information is relevant to an uplink resource allocation. This can provide a method of uplink resource allocation and may further provide an indication field to include a resource selection indication.

In some embodiments, the processor 21 is configured to control the transceiver 23 to transmit a first information, wherein the first information is relevant to an uplink resource allocation. This can provide a method of uplink resource allocation and may further provide an indication field to include a resource selection indication.

Figure 3:
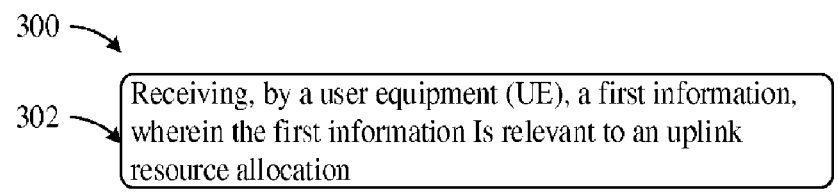
FIG. 3 is a flowchart illustrating a method of communication of a UE according to an embodiment of the present disclosure.

FIG. 3 illustrates a method 300 of communication of a UE according to an embodiment of the present disclosure. In some embodiments, the method 300 includes: a block 302, receiving, by a UE, a first information, wherein the first information is relevant to an uplink resource allocation. This can provide a method of uplink resource allocation and may further provide an indication field to include a resource selection indication.

Figure 4:
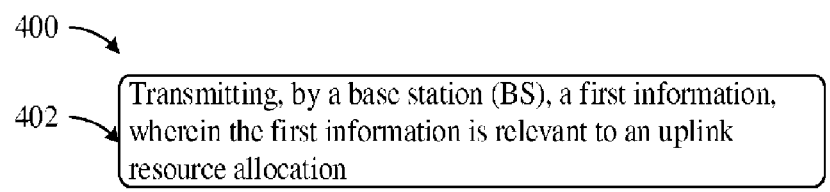
FIG. 4 is a flowchart illustrating a method of communication of a BS according to an embodiment of the present disclosure.

FIG. 4 illustrates a method 400 of communication of a BS according to an embodiment of the present disclosure. In some embodiments, the method 400 includes: a block 402, transmitting, by a BS, a first information, wherein the first information is relevant to an uplink resource allocation. This can provide a method of uplink resource allocation and may further provide an indication field to include a resource selection indication.

In some embodiments, the uplink resource allocation comprises one or more resource block (RB) sets for a PUSCH transmission in an active uplink bandwidth part (UL BWP), wherein the PUSCH is scheduled by the first information. In some embodiments, the active UL BWP is an initial UL BWP. In some embodiments, wherein the first information comprises at least one of the following: a DCI format 0_0 scrambled with a temporary cell radio network temporary identifier (TC-RNTI) or a cell radio network temporary identifier (C-RNTI) or a modulation and coding scheme cell radio network temporary identifier (MCS-C-RNTI) or a configured scheduling radio network temporary identifier (CS-RNTI); or an uplink grant in a random access response (RAR), where the RAR is transmitted in a physical downlink shared channel (PDSCH). In some embodiments, the DCI format 0_0 is transmitted in a physical downlink control channel (PDCCH) in a common search space. In some embodiments, the first information comprises an indication field for resource block (RB) set indication. In some embodiments, the indication field contains Y bits, where the value Y is related to at least one of the following: a number of RB sets in the initial UL BWP; or a number of RB sets in the active UL BWP. In some embodiments, the one or more RB sets are determined by the indication field. In some embodiments, the one or more RB sets comprise the RB set corresponding to a first set of RB set indices, wherein the first set of RB set indices are defined in an active UL BWP, and the first set of RB set indices comprising at least one RB set index. In some embodiments, the indication field indicates the first set of RB set indices.

In some embodiments, the indication field indicates a second set of RB set indices, wherein the second set of RB set indices comprising at least one RB set index. In some embodiments, the second set of RB set indices are defined in an initial UL BWP. In some embodiments, the first set of RB set indices are determined from the second set of RB set indices. In some embodiments, the RB sets corresponding to the first RB set indices in the active UL BWP are overlapped with the RB sets corresponding to the second RB set indices in the initial UL BWP. In some embodiments, the first set of RB set indices are equal to the second set of RB set indices. In some embodiments, the first set of RB set indices are equal to the second set of RB set indices with modulo operation. In some embodiments, the one or more RB set are determined from a reference RB set of an active downlink (DL) BWP. In some embodiments, the one or more RB set comprises one RB set that intersects with the reference RB set. In some embodiments, the reference RB set is the smallest RB set index of the RB sets in the active DL BWP in which the PDCCH or the PDSCH is located. In some embodiments, the one or more RB sets are a default RB set of the active UL BWP.

In a wireless communication system, a modulo operation specified by Equation 1 is used to represent a modulo N operation, e.g. mod(0,2)=0, mod(1,2)=1, mod(2,2)=0.

$$b = \mathrm{mod}(a, N) (\text{where}, 0 \leq b < N) \qquad \qquad \text{<Equation 1>}$$

In some embodiments, the one or more RB sets comprise the RB set according to the smallest RB set index among the RB sets in the active UL BWP, wherein the RB sets in the active UL BWP intersect the RB sets of the active DL BWP, in which the PDCCH or the PDSCH is located. In some embodiments, the RB sets of the initial UL BWP are configured in a system information. In some embodiments, the system information comprises an information element ServingCellConfigCommonSIB, wherein the information element ServingCellConfigCommonSIB comprises a configuration relevant to an RB set configuration for the initial UL BWP. In some embodiments, the RB set configuration in the information element ServingCellConfigCommonSIB cannot be different from the RB set configuration in an information element ServingCellConfigCommon for a given serving cell, where the information element ServingCellConfigCommon is configured in a UE-specific radio resource control (RRC) information element. In some embodiments, the one or more RB sets are determined based on one or more RB sets in which a physical random access channel (PRACH) transmission is performed. In some embodiments, the RB set for the PUSCH transmission is the same RB set, in which the latest PRACH transmission is transmitted by the same UE before receiving the first information.

In some embodiments, the uplink resource allocation comprises one or more allocated resource block (RB) sets. In some embodiments, the allocated RB set comprises an initial uplink bandwidth part. In some embodiments, the one or more allocated RB sets are in an active uplink bandwidth part. In some embodiments, the one or more allocated RB sets are from a total RB sets in the active uplink bandwidth part. In some embodiments, the one or more allocated RB sets are one or more dedicated RB sets in the active uplink bandwidth part. For example, the dedicated RB sets are all RB sets of the active uplink bandwidth part. In some embodiments, the dedicated RB set is RB set index 0 or the first RB set in the active uplink bandwidth part. In some embodiments, the dedicated RB set is RB set index N−1 or the last RB set (Nth RB set) in the active uplink bandwidth part, where N is the number of the RB sets in the active uplink bandwidth part. In some embodiments, the dedicated RB set corresponds to the active uplink bandwidth part and an initial uplink bandwidth part. In some embodiments, the dedicated RB set is the RB set in the active uplink bandwidth part that overlaps with the initial uplink bandwidth part, where the active uplink bandwidth part and the initial uplink bandwidth part have a same subcarrier spacing (SCS) and a same cyclic prefix (CP) length, and the active uplink bandwidth part comprises all RB sets of the initial uplink bandwidth part, or the active uplink bandwidth part is the initial uplink bandwidth part. For example, the active uplink bandwidth part includes all RB sets of the initial uplink bandwidth part.

In some embodiments, the dedicated RB set is pre-defined in a specification or pre-configured. In some embodiments, the first information corresponds to a first downlink control indicator (DCI) format. In some embodiments, the first DCI format is used to a schedule physical uplink shared channel (PUSCH) for a serving cell. For example, the first DCI format is used to schedule the PUSCH for one serving cell. In some embodiments, the first DCI format is DCI format 0_0. In some embodiments, the DCI format 0_0 is in a common search space (CSS). In some embodiments, the DCI format 0_0 is in a UE-specific search space (USS). In some embodiments, the DCI format 0_0 is cyclic redundancy check (CRC) scrambled with a cell radio network temporary identifier (C-RNTI) or a configured scheduling radio network temporary identifier (CS-RNTI) or a modulation and coding scheme radio network temporary identifier (MCS-RNTI) or a temporary cell radio network temporary identifier (TC-RNTI). In some embodiments, the DCI format 0_0 comprises an indication field, and the indication field is frequency domain resource assignment. In some embodiments, a field of the frequency domain resource assignment has X bits, and X bits are used to indicate one or more interlaces. In some embodiments, X is equal to 5 when a subcarrier spacing is equal to 15 Khz, or X is equal to 6 when the subcarrier spacing is equal to 30 Khz. In some embodiments, a field of the frequency domain resource assignment has X plus Y bits, X bits are used to indicate one or more interlaces, and Y bits are used to indicate one or more RB sets. In some embodiments, most significant X bits are used to indicate interlace, and least significant Y bits are used to indicate one or more RB sets.

In some embodiments, $$Y = \left\lceil \log_2\left(\frac{N(N+1)}{2}\right) \right\rceil \text{ bits,}$$

where N is a number of the RB sets in the initial uplink bandwidth part. In some embodiments, the first information corresponds to a random access response (RAR) uplink grant. In some embodiments, the RAR uplink grant comprises a PUSCH frequency resource allocation field. In some embodiments, the PUSCH frequency resource allocation field has K bits, where K is an integer. In some embodiments, X bits are within K bits, and X bits are used to indicate one or more interlaces. In some embodiments, least significant X bits are used to indicate one or more interlaces. In some embodiments, X is equal to 5 when a subcarrier spacing is equal to 15 Khz, or X is equal to 6 when the subcarrier spacing is equal to 30 Khz. In some embodiments, Y bits are within K bits, and Y bits are used to indicate one or more RB sets. In some embodiments, least significant Y bits are used to indicate one or more RB sets. In some embodiments, K is equal to 12. In some embodiments, the uplink resource allocation is an uplink resource allocation type 2. In some embodiments, the uplink resource allocation type 2 is used when a higher layer parameter, useInterlacePUSCH-Common or useInterlacePUSCH-Dedicated, is set to enabled. In some embodiments, the uplink resource allocation further comprises one or more interlaces. In some embodiments, the uplink resource allocation is determined as an intersection of RBs of the one or more indicated interlaces, the indicated or determined RB sets, and an intra-cell guard band between the indicated or determined RB sets.

FIG. 1 illustrates that, in some embodiments, when the BS 20 (e.g. a gNB) schedules the UE 10 to transmit an uplink transmission in a PUSCH, the gNB 20 will indicate an uplink resource allocation for the PUSCH. The UE 10 can obtain the uplink resource allocation via a first information. In some embodiments, the uplink resource allocation comprises one or more resource block (RB) sets. Moreover, the uplink resource allocation further comprises one or more interlaces. The UE 10 can determine the uplink resource allocation as an intersection of RBs of the indicated interlaces, the indicated or determined RB sets, and an intra-cell guard band between the indicated or determined RB sets. In some embodiments, the first information is received by the UE 10 and it is used to determine the indicated interlaces and the RB sets. In some embodiments the RB sets are indicated by the first information. This solution is a simple solution but overhead needs to be added in the first information for RB set indication. In some other embodiments the RB sets are not indicated by the first information but there is correspondence between the first RB sets and the first information, so that the UE 10 can derive the RB sets based on the first information. This solution is more complicated, but it reduces the indication overhead for signaling.

In some embodiments, the first information is DCI format 0_0. The DCI format 0_0 is used to schedule PUSCH transmission for a serving cell. The DCI format 00 comprises an indication field, frequency domain resource assignment (FDRA) field. When the DCI format 0_0 is CRC scrambled with TC-RNTI, the DCI format 0_0 is used to schedule message 3 (Msg3) retransmission and the DCI format 0_0 can be received in a common search space (CSS). In some embodiments, the FDRA field does not have dedicated bits for RB set indication.

In some embodiments, the first information is DCI format 0_0 with CRC scrambled with C-RNTI or CS-RNTI or MCS-RNTI, the DCI format 0_0 is used to schedule PUSCH transmission for connected UE and the DCI format 0_0 can be received in a common search space (CSS). The DCI format 0_0 comprises an indication field, frequency domain resource assignment (FDRA) field, and the FDRA field does not have dedicated bits for RB set indication when the DCI format 0_0 is received in the CSS.

In some embodiments, the first information is DCI format 0_0 with CRC scrambled with C-RNTI or CS-RNTI or MCS-RNTI, the DCI format 0_0 is used to schedule PUSCH transmission for connected UE and the DCI format 0_0 can be received in a UE-specific search space (USS). The FDRA field in DCI format 0_0 has dedicated bits for RB set indication when the DCI format 0_0 is received in the USS and the number of bits corresponds to the number of RB sets in active uplink bandwidth part. In some embodiments, the FDRA field does not have dedicated bits for RB set indication when the DCI format 0_0 is received in the USS.

In some embodiments, the first information is an uplink grant in random access response (RAR). It is used to schedule the initial transmission of Msg3. This information can be received by initial access UE (idle UE) or connected UE. In RAR uplink grant, there is PUSCH FDRA field, and this field does not have dedicated bits for RB set indication. In some embodiments, when FDRA field in RAR uplink grant has dedicated bits for RB set indication, the UE determines the indicated RB sets from the FDRA field. In some embodiments, when the FDRA field in RAR uplink grant does not have dedicated bits for RB set indication, the UE determines the RB sets as the dedicated RB set in the active uplink bandwidth part. In some embodiments, the dedicated RB set is the first RB set in the active uplink bandwidth part. If the RB sets are indexed in the active uplink bandwidth part, the dedicated RB set is RB set index 0 or RB set 0. In some embodiments, the dedicated RB set is the last RB set in the active uplink bandwidth part. If the RB sets are indexed in the active uplink bandwidth part, the dedicated RB set is RB set index N−1 or RB set N−1, where N is the number of the RB sets in the active uplink bandwidth part.

Example

Figure 5:
FIG. 5 is a schematic diagram illustrating that a carrier bandwidth contains 3 RB sets and an initial UL BWP contains one RB set according to an embodiment of the present disclosure.

FIG. 5 illustrates that a carrier bandwidth contains 3 RB sets and an initial UL BWP contains one RB set according to an embodiment of the present disclosure. FIG. 5 illustrates that, in an example, for a PUSCH transmission scheduled by an uplink grant (UL) in RAR or scheduled by a DCI format 0_0 with CRC scrambled with TC-RNTI, if the PUSCH is configured with interlaced transmission, the RB set in which the PUSCH is transmitted is indicated by PUSCH frequency domain resource allocation (FDRA) field in UL RAR or by FDRA field in the DCI format 0_0 scrambled by TC-RNTI. In what follows throughout all the examples, we use FDRA field to represent the PUSCH FDRA field in UL grant RAR or the FDRA field in DCI format 0_0 scrambled with TC-RNTI, unless indicated otherwise. In case for a UE, the active UL BWP is the initial UL BWP and it contains only one RB set, the allocated RB set for PUSCH transmission is the RB set of the active UL BWP and the UE will ignore the FDRA field indication.

Optionally, the UE may still read the RB set indication bits in FDRA field, but the UE does not expect that the base station indicates any RB sets outside the active UL BWP. As illustrated in FIG. 5, where for an idle UE, its initial UL BWP contains only one RB set (RB set 0). The UE does not expect that the base station indicates RB set other than RB set 0 in FDRA field.

Optionally, PUSCH FDRA field contains Y bits, where $$Y = \left\lceil \log_2\left(\frac{N(N+1)}{2}\right) \right\rceil \text{ bits,}$$

and N is a number of the RB sets in the carrier bandwidth or N is a number of the RB sets in the initial UL BWP or N is a number of the RB sets in carrier bandwidth. Optionally, the Y bits are the most significant bits in FDRA field or the least significant bits in FDRA field.

Example

Figure 6:
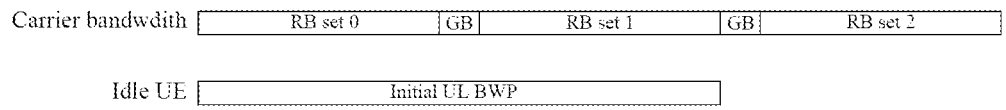
FIG. 6 is a schematic diagram illustrating that a carrier bandwidth contains 3 RB sets and an initial UL BWP contains 2 RB sets according to an embodiment of the present disclosure.

FIG. 6 illustrates that a carrier bandwidth contains 3 RB sets and an initial UL BWP contains 2 RB sets according to an embodiment of the present disclosure. FIG. 6 illustrates that, in an example for a UE, the active UL BWP is the initial UL BWP and it contains more than one RB set, as illustrated in FIG. 6, for the PUSCH transmission scheduled by the uplink grant (UL) in RAR or scheduled by the DCI format 0_0 with CRC scrambled with TC-RNTI, the FDRA field includes Y bits for RB set allocation, where $$Y = \left\lceil \log_2\left(\frac{N(N+1)}{2}\right) \right\rceil \text{ bits,}$$

and N is a number of the RB sets in the initial UL BWP. The UE should follow the RB set indication from PUSCH FDRA field to determine the allocated RB set. Optionally, the base station can only indicate one RB set, and in an example, if the base station indicates RB set 0, the UE will transmit the PUSCH in the RBs intersecting between RB set 0 and initial UL BWP and the indicated interlace(s). Optionally, the base station can indicate more than one RB set, in FIG. 6, if the base station indicates RB set 0 and RB set 1, the UE determines the RBs for PUSCH transmission as the RBs intersecting between the RB set 0 and the RB set 1 and the initial UL BWP and the guard band between these two RB sets and the indicated interlace(s).

Example

Figure 7:
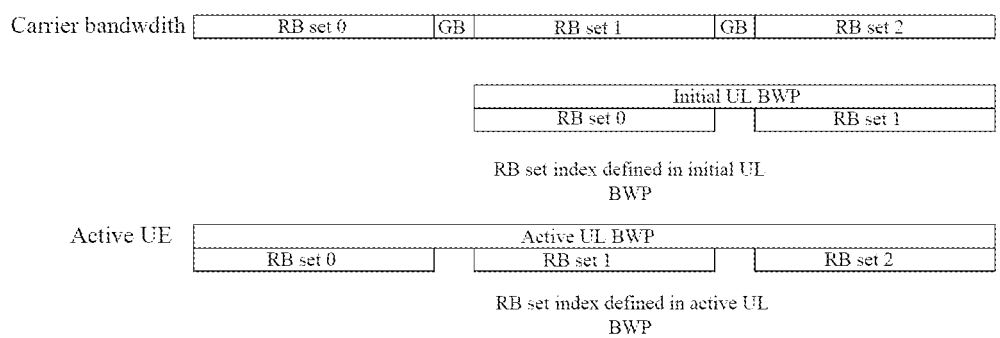
FIG. 7 is a schematic diagram illustrating that a carrier bandwidth contains 3 RB sets and an initial UL BWP contains 2 RB sets, an active UL BWP contains 3 RB sets; the active UL BWP includes all RB sets of the initial UL BWP according to an embodiment of the present disclosure.

FIG. 7 illustrates that a carrier bandwidth contains 3 RB sets and an initial UL BWP contains 2 RB sets, an active UL BWP contains 3 RB sets; the active UL BWP includes all RB sets of the initial UL BWP according to an embodiment of the present disclosure. FIG. 7 illustrates that, in an example, for a UE, the active UL BWP is different from the initial UL BWP, and the active UL BWP includes all the RB sets of the initial UL BWP and the active UL BWP has the same subcarrier spacing and CP length as the initial UL BWP, as illustrated in FIG. 7. Then, the FDRA field contains Y bits for RB set indication, $$Y = \left\lceil \log_2\left(\frac{N(N+1)}{2}\right) \right\rceil \text{ bits,}$$

and N is a number of the RB sets in the initial UL BWP. Moreover, the indicated RB set indices with Y bits are the RB set indices defined in the initial UL BWP which is not the RB set indices defined in the active UL BWP. To illustrate the difference, we can take FIG. 7 as an example, the active UL BWP includes all the RB sets of the initial UL BWP. Then, the FDRA field includes Y bits to indicate the one or two RB sets. If the FDRA field indicates RB set 0, it should be understood that the PUSCH is transmitted in RB set of the active UL BWP that is overlapped with the indicated RB set 0 defined in the initial UL BWP. This is because the RB set 0 defined in the active UL BWP has a different location from the RB set 0 defined in the initial UL BWP. The reason of this difference is that the RB set index is ordered from the start of the BWP. Thus, if the initial UL BWP and the active UL BWP have different start points, this ambiguity may arise. Thus, the UE should first derive the RB set index from FDRA field, then derive the corresponding RB set index in the active UL BWP. In an example, it means that if the FDRA field indicates RB set 0, the UE will understand that it is the RB set 0 location defined in the initial UL BWP and then the UE will derive the corresponding RB set index in the active UL BWP, i.e. determine the RB set in active UL BWP that is overlapped with the indicated RB set in the initial UL BWP, e.g. in FIG. 3 the RB set 0 in the initial UL BWP corresponds to RB set 1 in the active UL BWP. Thus, the actual determined RB set for PUSCH transmission is RB set 1 in active UL BWP. This operation is necessary, because the actual PUSCH is transmitted in active UL BWP not initial UL BWP. Optionally, to avoid this operation, the UE can directly transmit the PUSCH in the initial UL BWP, for this case, the above presented RB set index correspondence derivation for the indicated RB set index from the initial UL BWP to the active UL BWP is not needed. But this option requires the UE to transmit the PUSCH in the initial UL BWP, and thus, the UE needs to switch from the active UL BWP to the initial UL BWP.

Figure 8:
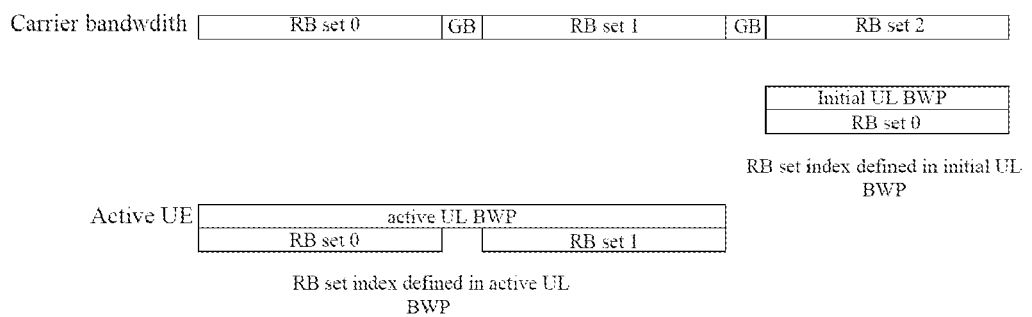
FIG. 8 is a schematic diagram illustrating that a carrier bandwidth contains 3 RB sets and an initial UL BWP contains 1 RB set, an active UL BWP contains 2 RB sets; the active UL BWP does not include all RB sets of the initial UL BWP according to an embodiment of the present disclosure.

FIG. 8 illustrates that a carrier bandwidth contains 3 RB sets and an initial UL BWP contains 1 RB set, an active UL BWP contains 2 RB sets; the active UL BWP does not include all RB sets of the initial UL BWP according to an embodiment of the present disclosure. FIG. 8 illustrates that, in an example, on the other hand, for a UE, when the active UL BWP does not include all the RB sets of the initial UL BWP or the active UL BWP has different subcarrier spacing or CP length from the initial UL BWP, or when the active UL BWP has the same subcarrier spacing and CP length as the initial UL BWP, but the active UL BWP does not include any RB set of the initial UL BWP, as illustrated in FIG. 8, the FDRA field contains Y bits for RB set indication, $$Y = \left\lceil \log_2\left(\frac{N(N+1)}{2}\right) \right\rceil \text{ bits,}$$

and N is a number of the RB sets in the active UL BWP. The UE determines the allocated RB sets from the Y bits and the PUSCH transmitted in the indicated RB set of the active UL BWP. As illustrated in FIG. 8, the active UL BWP does not include all the RB sets of the initial UL BWP. In this case, the Y bits can indicate any RB sets configured in active UL BWP, i.e. either RB set 0 or RB set 1 or both RB set 0 and RB set 1 in active UL BWP.

Figure 9:
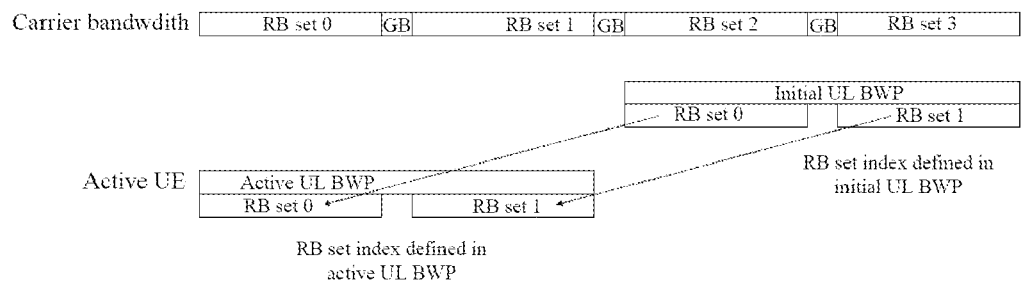
FIG. 9 is a schematic diagram illustrating that a carrier bandwidth contains 4 RB sets and an initial UL BWP contains 2 RB sets, an active UL BWP contains 2 RB sets; the active UL BWP does not include all RB sets of the initial UL BWP according to an embodiment of the present disclosure.

FIG. 9 illustrates that a carrier bandwidth contains 4 RB sets and an initial UL BWP contains 2 RB sets, an active UL BWP contains 2 RB sets; the active UL BWP does not include all RB sets of the initial UL BWP according to an embodiment of the present disclosure. FIG. 9 illustrates that, optionally, the FDRA field contains Y bits for RB set indication, $$Y = \left\lceil \log_2\left(\frac{N(N+1)}{2}\right) \right\rceil \text{ bits,}$$

and N is a number of the RB sets in the initial UL BWP. But in this case, the indicated RB set index is directly determined as the RB set index defined in active UL BWP. As illustrated in FIG. 9, if the Y bits indicate RB set 0, it means the RB set 0 in active UL BWP. If the Y bits indicate RB set 1, it means the RB set 1 inactive UL BWP.

Figure 10:
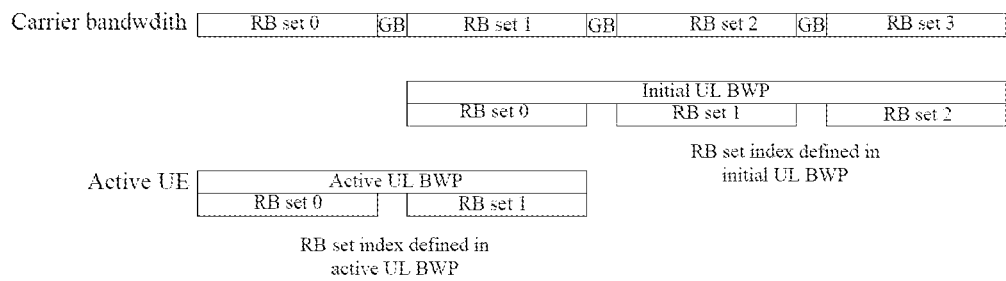
FIG. 10 is a schematic diagram illustrating that a carrier bandwidth contains 4 RB sets and an initial UL BWP contains 3 RB sets, an active UL BWP contains 2 RB sets; the active UL BWP does not include all RB sets of the initial UL BWP according to an embodiment of the present disclosure.

FIG. 10 illustrates that a carrier bandwidth contains 4 RB sets and an initial UL BWP contains 3 RB sets, an active UL BWP contains 2 RB sets; the active UL BWP does not include all RB sets of the initial UL BWP according to an embodiment of the present disclosure. FIG. 10 illustrates that, in some examples, for a UE, the active UL BWP is smaller than the initial UL BWP, i.e. the active UL BWP contains less RB sets than initial UL BWP, as illustrated in FIG, In this case, if the FDRA field contains Y bits to indicate RB set index, and the value of Y can be defined with alternative options.

In one option, the value of Y should be based on the minimum number of the RBs between the initial UL BWP and the active UL BWP. In FIG. 10, there are 3 RB sets in the initial UL BWP and 2 RB sets in the active UL BWP, therefore $$Y = \left\lceil \log_2\left(\frac{N(N+1)}{2}\right) \right\rceil \text{ bits,}$$

and N is min {the number of the RB sets in the initial UL BWP, the number of the RB sets in the active UL BWP}, thus, N=min(2,3)=2. Then, the indicated RB set index is directly the RB set index defined in active UL BWP, e.g. if indicated RB set index is RB set 0, it means that the PUSCH is transmitted in RB set 0 in active UL BWP.

Another option is a of Y bit is always based on the number of RB sets in the initial UL BWP, i.e.

$$Y = \left\lceil \log_2\left(\frac{N(N+1)}{2}\right) \right\rceil \text{ bits,}$$

and N is a number of the RB sets in the initial UL BWP. Then the UE will determine the RB set index for PUSCH transmission in the active UL BWP as RB set index=mod (indicated RB set index, m), where m is the number of the RB sets in active UL BWP, and mod(x, m) denotes as the x modulo m operation. In an example of FIG. 10, where the initial UL BWP contains 3 RB sets and the active UL BWP contains 2 RB sets, thus if the indicated RB set index is RB set 0, it corresponds to RB set mod(0,2)=0 in the active UL BWP. If the indicated RB set is 1, it corresponds to RB set mod(1,2)=1 in the active UL BWP. If the indicated RB set is 2, it corresponds to RB set mod(2,2)=0 in the active UL BWP. Optionally, the UE does not expect that the Y bits will indicate a RB set index that is larger than the maximum RB set index of the active UL BWP, or the UE does not expect that the Y bits indicate a number of the RB sets for PUSCH transmission that is larger than the total number of the RB sets of the active UL BWP.

Optionally, to avoid this modulo operation, the base station cannot configure an initial UL BWP containing more RB sets than active UL BWP. Although, this issue can be solved, this will introduce restriction for the base station configuration.

In some examples, when the active UL BWP has the same CP length and subcarrier spacing as initial UL BWP, but the active UL BWP partially overlaps with initial UL BWP, as illustrated in FIG. 10, where the RB set 1 of the active UL BWP is overlapped with the RB set 0 of the initial UL BWP, but the active UL BWP does not include the RB set 1 and RB set 2 of the initial U. In this case, the PUSCH FDRA field contains Y bits for RB set indication, where $$Y = \left\lceil \log_2\left(\frac{N(N+1)}{2}\right) \right\rceil \text{ bits,}$$

and N is a number of the RB sets in the initial UL BWP. The UE will only determine the RB sets of the active UL BWP that are overlapped with the RB sets of the initial UL BWP. For example, in FIG. 10, when Y bit indicates RB set 0, the UE will determine that PUSCH is transmitted in the RB set 1 of the active UL BWP because they are overlapped. Optionally, the UE may ignore the RB set indication if the Y bits indicate one or more RB sets that are not fully overlapped with the active UL BWP, for example, in FIG. 10, if the Y bits indicate RB set 0 and RB set 1, since the RB set 1 of the initial active BWP does not overlap with the active UL BWP, the UE sees the scheduling is not a valid scheduling so that the UE does not transmit PUSCH.

Example

In an example, the RB set determination for the PUSCH transmission is based on the RB set in which the PRACH transmission is performed. For example, the UE will determine that the RB set for the PUSCH transmission scheduled by UL RAR will be transmitted in the same RB set, in which the latest PRACH transmission is transmitted by the same UE.

Example

Figure 19:
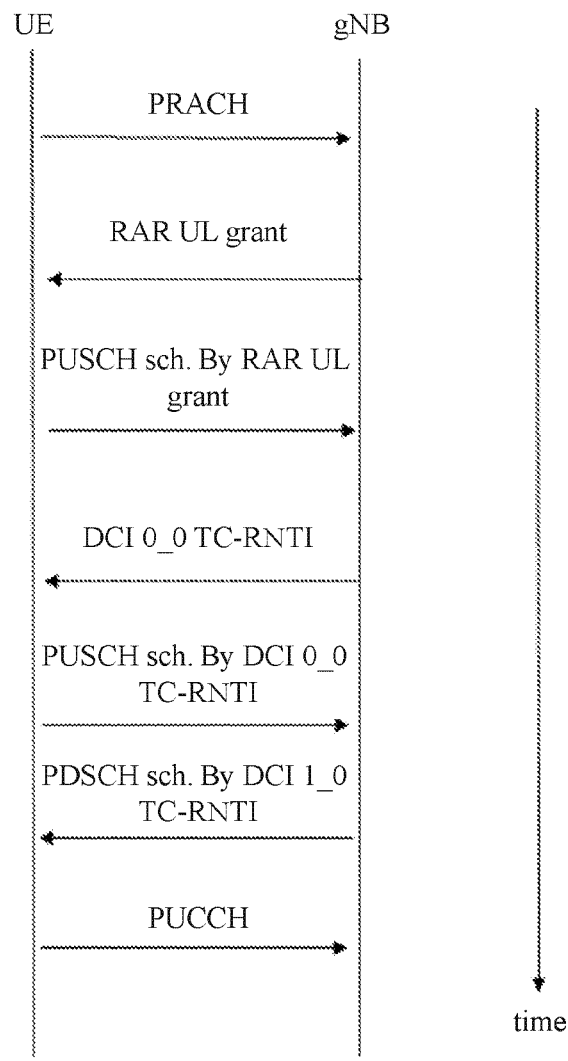
FIG. 19 is a flow diagram of a system for wireless communication according to an embodiment of present disclosure.

As shown in FIG. 19, a UE transmits a PRACH in an RB set to a base station (gNB). After the PRACH transmission, the UE receives an RAR UL grant scheduling a PUSCH transmission. The PUSCH transmission is in the same RB set of the previously transmitted the PRACH. Optionally, the UE receives a DCI format 0_0 scrambled by TC-RNTI scheduling a PUSCH transmission. The PUSCH is transmitted in the same RB set of the previously transmitted PRACH, or the PUSCH is transmitted in the same RB set of the previously transmitted PUSCH scheduled by the RAR UL grant. Optionally, the UE transmits a PUCCH in an RB set to the gNB, the PUCCH is transmitted in the same RB set as the previously transmitted PUSCH scheduled by the RAR UL grant or the PUCCH is transmitted in the same RB set as the previously transmitted PUSCH scheduled by the DCI format 0_0 scrambled by TC-RNTI, or the PUCCH is transmitted in the same RB set as the previously transmitted PRACH.

Example

Figure 11:
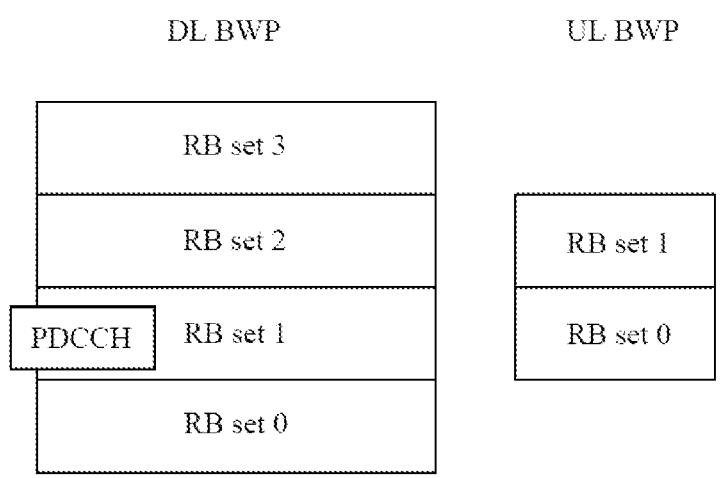
FIG. 11 is a schematic diagram illustrating that a detected PDCCH overlaps with RB set 1 of an active DL BWP, thus, the determined RB set in the active DL BWP is RB set 1, the corresponding RB set in the active UL BWP is the RB set 0 according to an embodiment of the present disclosure.

FIG. 11 illustrates that a detected PDCCH overlaps with RB set 1 of an active DL BWP, thus, the determined RB set in the active DL BWP is RB set 1, the corresponding RB set in the active UL BWP is the RB set 0 according to an embodiment of the present disclosure. FIG. 11 illustrates that, in some examples, for a PUSCH transmission scheduled by DCI format 0_0 that is CRC scrambled with TC-RNTI or C-RNTI or MCS-C-RNTI or CS-RNTI, and the DCI format 0_0 is transmitted in PDCCH, which is detected by the UE in common search space (CSS). The DCI format 0_0 does not contain dedicated bits for RB set indication. The UE will determine the RB set for PUSCH by RB set in active DL BWP. When the UE detects a PDCCH in CSS that carries the DCI format 0_0 scrambled with TC-RNTI or C-RNTI or MCS-C-RNTI or CS-RNTI, the UE will first determine the RB sets that overlap with the detected PDCCH. If there is only one RB set that overlaps with the detected PDCCH, as illustrated in FIG. 11, detected PDCCH overlaps with RB set 1 in the active DL BWP, then the RB set for PUSCH in the active UL BWP is the RB set that intersects with the determined RB set 1 in the active DL BWP, i.e. RB set 0 of the active UL BWP.

Figure 12:
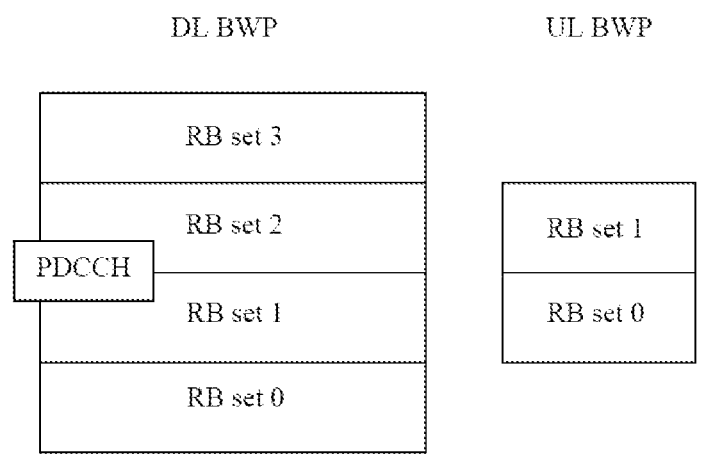
FIG. 12 is a schematic diagram illustrating that a detected PDCCH overlaps with RB set 1 and RB set 2 of an active DL BWP, thus, the selected RB set in the active DL BWP is RB set 1, the corresponding RB set in the active UL BWP is the RB set 0 according to an embodiment of the present disclosure.

FIG. 12 illustrates that a detected PDCCH overlaps with RB set 1 and RB set 2 of an active DL BWP, thus, the selected RB set in the active DL BWP is RB set 1 (e.g. the smallest RB set index rule), the corresponding RB set in the active UL BWP is the RB set 0 according to an embodiment of the present disclosure. FIG. 12 illustrates that, in another example, if the detected PDCCH overlaps with more than one RB set, as illustrated in FIG. 12, where the detected PDCCH overlaps with RB set 1 and RB set 2 of the active DL BWP. First, the UE determines the RB set in active DL BWP as the smallest RB set index or largest RB set index. If the take the rule of the smallest RB set index as example, the determined RB set index of the active DL BWP is the RB set 1. Then, the UE determines the RB set of the active UL BWP as the intersecting RB set of the determined RB set 1 of the active DL BWP, i.e. the RB set 0 of the active UL BWP. Therefore, the mechanism is that when the detected PDCCH overlaps with more than one RB sets in the active DL BWP, the UE first selects one RB set among the overlapped RB sets, then the UE finds the corresponding RB set in active UL BWP that intersects with the selected RB set of the active DL BWP. The selected RB set of the active DL BWP among the overlapped RB sets can be the smallest RB set index or the largest RB set index.

Figure 13:
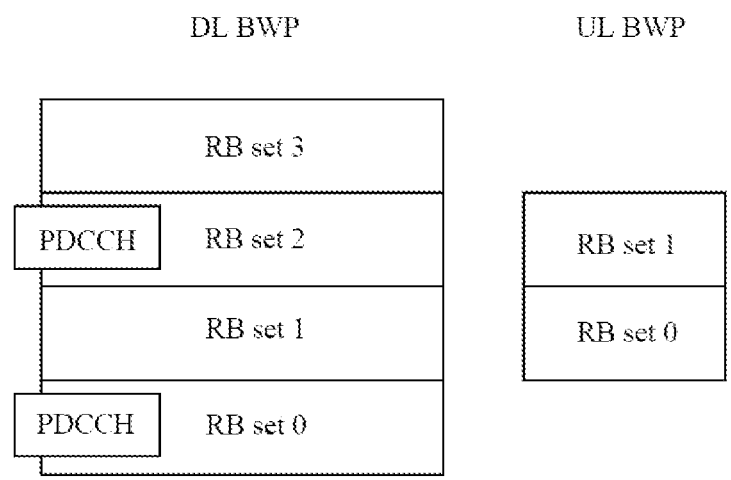
FIG. 13 is a schematic diagram illustrating that a detected PDCCH overlaps with RB set 0 and RB set 2 of an active DL BWP, thus, the selected RB set in the active DL BWP is RB set 0, there is no RB set of the active UL BWP that intersects with RB set 0 of the active DL BWP, the UE uses a default RB set of the active UL BWP for PUSCH transmission according to an embodiment of the present disclosure.

FIG. 13 illustrates that a detected PDCCH overlaps with RB set 0 and RB set 2 of an active DL BWP, thus, the selected RB set in the active DL BWP is RB set 0 (e.g. the smallest RB set index rule), there is no RB set of the active UL BWP that intersects with RB set 0 of the active DL BWP, the UE uses a default RB set of the active UL BWP for PUSCH transmission according to an embodiment of the present disclosure. FIG. 13 illustrates that, in some examples, where part of the PDCCH resources are overlapped with RB set 0 and another part of the PDCCH resources are overlapped with RB set 2 of the active DL BWP, following the presented mechanism, the selected RB set of the active DL BWP does not intersect with any RB sets of the active UL BWP, as illustrated in FIG. 13. Thus, the PUSCH is allocated in a default RB set index of the active UL BWP. The default RB set is specified in the specifications, for example the default is the first RB set of the active UL BWP, i.e. RB set 0.

Figure 14:
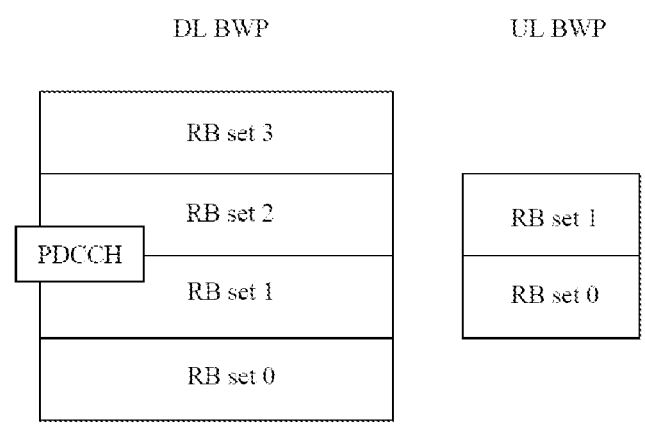
FIG. 14 is a schematic diagram illustrating that a detected PDCCH overlaps with RB set 1 and RB set 2 of an active DL BWP, thus, the intersecting RB set in the active UL BWP are RB set 0 and RB set 1, the UE determines RB set 0 as the RB set for PUSCH transmission according to an embodiment of the present disclosure.

FIG. 14 illustrates that a detected PDCCH overlaps with RB set 1 and RB set 2 of an active DL BWP, thus, the intersecting RB set in the active UL BWP are RB set 0 and RB set 1, the UE determines RB set 0 (e.g. smallest RB set index rule) as the RB set for PUSCH transmission according to an embodiment of the present disclosure. FIG. 14 illustrates that, optionally, the RB set determination mechanism is that if the detected PDCCH overlaps with more than one RB sets in the active DL BWP, the UE will determine all the RB sets of the active UL BWP that intersect with the more than one RB sets of the active DL BWP, then the UE selects the smallest RB set index or the largest RB set index from the RB sets of the active UL BWP. As illustrated in FIG. 14, the detected PDCCH overlaps with RB set 1 and RB set 2 of the active DL BWP, then the UE determines all the RB sets of the active UL BWP that intersect with these two RB sets, so the UE determines RB set 0 and RB set 1, then the UE selects the smallest RB set index (RB set 0) or the largest RB set index (RB set 1) as the RB set for the PUSCH transmission.

Figure 15:
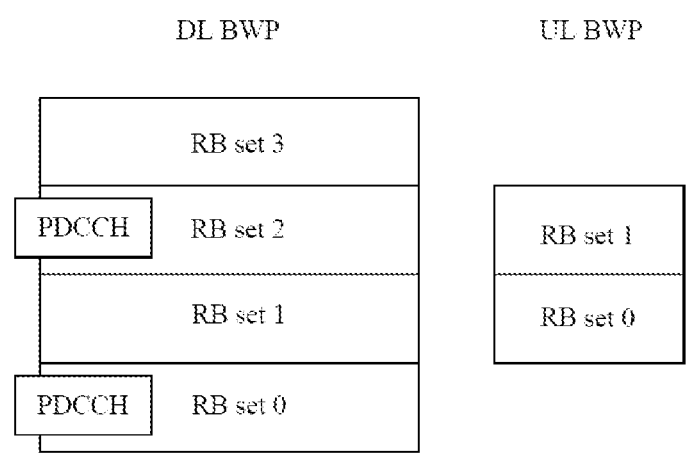
FIG. 15 is a schematic diagram illustrating that a detected PDCCH overlaps with RB set 0 and RB set 2 of an active DL BWP, thus, the intersecting RB set in the active UL BWP is only RB set 1 in the active UL BWP, thus, the UE determines RB set 1 for PUSCH transmission according to an embodiment of the present disclosure.

FIG. 15 illustrates that a detected PDCCH overlaps with RB set 0 and RB set 2 of an active DL BWP, thus, the intersecting RB set in the active UL BWP is only RB set 1 in the active UL BWP, thus, the UE determines RB set 1 for PUSCH transmission according to an embodiment of the present disclosure. FIG. 15 illustrates that, following this mechanism, in an example, a detected PDCCH overlaps with RB set 0 and RB set 2 of an active DL BWP, thus, the intersecting RB set in the active UL BWP is only RB set 1 in the active UL BWP, thus, the UE determines RB set 1 for PUSCH transmission. This shows the difference from the mechanism presented for an example of FIG. 13.

Example

For an idle UE, the UE needs to obtain the RB set configuration first in order to read the RB set indication from RAR UL grant. Otherwise, the UE does not understand the RB set locations. The RB set is firstly configured in carrier bandwidth and the carrier bandwidth is divided into one or more RB sets by intra-cell guard band. These guard band (GB) locations and lengths can be configured. If it is not configured, there can also be default values for the GB locations and lengths specified in the specifications. To obtain the RB set configuration, the base station can send intra-cell guard band configuration in the system information such as system information block (SIB). Optionally, the system information contains an information element ServingCellConfigCommonSIB, which further contains parameters intraCellGuardBandUL-r16 and intraCellGuardBandDL-r16 for uplink carrier RB set configuration and downlink carrier RB set configuration, respectively. Once the carrier RB set is configured, the RB set in UL BWP can be derived from the intersection between the configured carrier RB set and configured initial UL BWP. Optionally, in some cases, the carrier RB set can be derived from a default RB set configuration with default guard band length and locations specified in the specification.

Optionally, for an active UE, the intra-cell guard band can also be configured in an information element ServingCellConfigCommon. Since there is already the intra-cell guard band in the system information, therefore, the UE does not expect that for the same serving cell the intra-cell guard band configuration in ServingCellConfigCommon is different from that of in ServingCellConfigCommonSIB. Optionally, there is one exception that the base station can configure different intra-cell guard band configuration in ServingCellConfigCommon and in ServingCellConfigCommonSIB. The exception is that if the active UL BWP does not include any RB set of the initial UL BWP.

In some embodiments, the dedicated RB sets are all the RB sets of the active uplink bandwidth part. In some embodiments, the dedicated RB set is the initial uplink bandwidth part. In some embodiments, the dedicated RB set corresponds to the initial uplink bandwidth part and active uplink bandwidth part. It means that the dedicated RB set is determined by the initial uplink bandwidth part and the active uplink bandwidth part. If the active uplink bandwidth part and the initial uplink bandwidth part have same SCS and same CP length and the active uplink bandwidth part includes all RB sets of the initial uplink bandwidth part, or the active uplink bandwidth part is the initial uplink bandwidth part, the dedicated RB set is the initial uplink bandwidth part. Otherwise, the dedicated RB set is the first RB set in the active UL BWP or the last RB set in the active UL BWP; or the number of RBs equals to the number of RBs in the initial uplink bandwidth part, starting from the first RB of the active uplink bandwidth part.

In some embodiments, the uplink resource allocation is type 2. In uplink resource allocation of type 2, the resource block assignment information indicates, to a UE, a set of up to N interlace indices, and/or a set of up to N RB sets, where N is the number of RB sets in the active bandwidth part. When a higher layer parameter, useInterlacePUSCH-Common or useInterlacePUSCH-Dedicated, is set to enabled in which case uplink resource allocation type 2 is used.

In some embodiments, when the DCI format 0_0 is CRC scrambled with TC-RNTI, the DCI format 0_0 is used to schedule message 3 (Msg3) retransmission. Since the Msg3 can be sent by both initial access UE (a.k.a. idle UE), i.e. a UE not yet connected to a network, and a connected UE (i.e. a UE already connected the network). At a stage of scheduling Msg3, the network does not know if this Msg3 is sent by the connected UE or the initial access UE. Thus, the FDRA field does not contain an explicit RB set indication. This is because, to be able to provide an RB set indication, the network needs to know the number of RB sets in the active uplink bandwidth part for a UE. For an initial access UE, if it receives DCI format 0_0 with CRC scrambled with TC-RNTI, the FDRA field only has X bits, where X=5 for a subcarrier spacing=15 Khz; or X=6 for the subcarrier space=30 Khz. The X bits are used to indicate interlace indices. And the UE will determine the RB set as the initial uplink bandwidth part. The uplink resource allocation is then determined as an intersection of the RBs of the indicated

```
ServingCellConfigCommonSIB ::=    SEQUENCE {
    intraCellGuardBandUL-r16                    IntraCellGuardBand-r16
OPTIONAL, -- Need M
    intraCellGuardBandDL-r16                    IntraCellGuardBand-r16
OPTIONAL   -- Need M
}
``` interlaces and the initial uplink bandwidth part. Note that the initial uplink bandwidth part can be considered containing only one RB set. Therefore, there is no intra-cell guard band between two RB sets. This solution can be used as a solution 1. This solution does not provide an explicit RB set indication and provides an implicit RB set indication by indicating interlace indices by the FDRA field having X bits. The advantages of this solution include small DCI overhead, high reliability, and more suitable for scheduling PUSCH in CSS. Because it requires high reliability. Moreover, the solution is unified for both idle UE and connected UE, which does not depend on specific UE configuration. Thus, this solution is very suitable for Msg3 retransmission.

Figure 16:
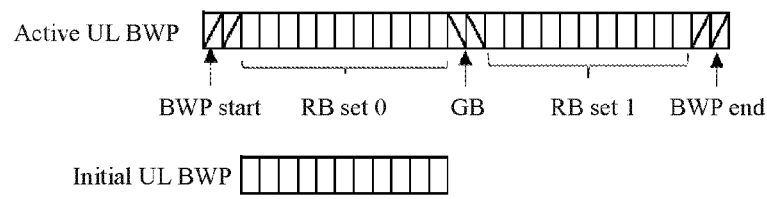
FIG. 16 is a schematic diagram illustrating an active uplink bandwidth part (UL BWP) and an initial UL BWP according to an embodiment of the present disclosure.

FIG. 16 illustrates an active uplink bandwidth part (UL BWP) and an initial UL BWP according to an embodiment of the present disclosure. For a connected UE, if it receives the DCI format 0_0 with CRC scrambled with TC-RNTI, the FDRA field only has X bits, where X=5 for the subcarrier spacing=15 Khz; or X=6 for the subcarrier space=30 Khz. The X bits are used to indicate interlace indices. And the UE will determine the RB set as following. If the active UL BWP and the initial UL BWP have same SCS and same CP length and the active UL BWP includes all RB sets of the initial UL BWP as illustrated in FIG. 16, the RB set is the RB set in the active UL BWP that overlaps with the initial UL BWP. FIG. 16 illustrates that, in some embodiments, in the active UL BWP, there are two RB sets, i.e. RB set 0 and RB set 1. The active UL BWP includes all the RB sets of initial UL BWP. Moreover, it is assumed that the active UL BWP and the initial UL BWP have the same subcarrier spacing and CP length. In this case, the determined RB set in the active UL BWP is the one that overlaps with the initial UL BWP, which in FIG. 16 is RB set 0. This solution can be used as a solution 2. This solution does provide an explicit RB set indication and provides an implicit RB set indication by indicating interlace indices by the FDRA field having X bits. The advantages of this solution include small DCI overhead, high reliability, and more suitable for scheduling PUSCH with DCI format 0_0 in CSS. Because it requires high reliability.

In another example, if the active UL BWP is the initial UL BWP, it is similar to the idle UE case that is mentioned above. Thus, the solution 1 can be applied.

Figure 17:
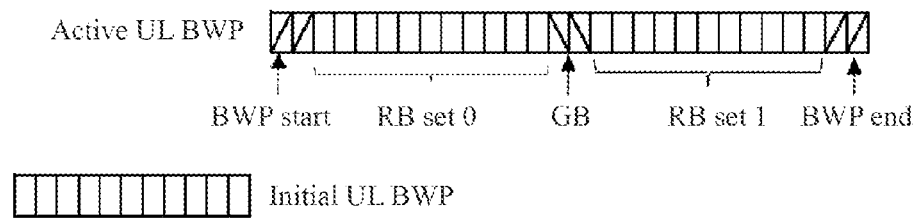
FIG. 17 is a schematic diagram illustrating an active uplink bandwidth part (UL BWP) and an initial UL BWP according to another embodiment of the present disclosure.

FIG. 17 illustrates an active uplink bandwidth part (UL BWP) and an initial UL BWP according to another embodiment of the present disclosure. In some embodiments, if the active UL BWP does not include all the RB sets of the initial UL BWP (as illustrated in FIG. 17), or the active uplink bandwidth part and the initial uplink bandwidth part do not have the same SCS or CP length, the UE will determine the RB set as a dedicated RB set in the active UL BWP. This dedicated RB set can be the first RB set, i.e. RB set 0 or the last RB set. The last RB set in an example as illustrated in FIG. 17 is RB set 1. This solution can be used as a solution 3. This solution does not provide an explicit RB set. The advantages of this solution include that the active uplink bandwidth part configuration is less restricted in terms of size or SCS or CP length and is suitable for scheduling PUSCH with DC format 0_0 in both CSS and USS.

In some embodiments, if only one RB set is considered as the dedicated RB set will restrict a throughput, an alternative way is to consider all the RB sets in the active UL BWP as the dedicated RB set. This solution can be used as a solution 4. This solution does not provide an explicit RB set. The advantages of this solution include that a scheduling received by the UE is to target high throughput service as more RB sets are to be used and more suitable for scheduling PUSCH with DCI format 0_0 in USS. But this solution can be also applied for DCI format 0_0 in CSS.

Optionally, selecting an RB set or selecting all RB sets can be configured by the network, for example, can be configured by RRC or configured by system information.

For UE receiving DCI format 0_0 in CSS and the DCI format 0_0 is CRC scrambled with C-RNTI or CS-RNTI or MCS-RNTI, in the DCI format 0_0, the FDRA field is more suitable to not include dedicated bits for RB set indication. The advantages of this solution include followings. This is to align a DCI size for all PDCCH monitoring in the CSS that is not dependent of RRC configuration (the number of RB sets in active UL BWP is a RRC configuration and it varies from UE to UE). In this case, solution 1 or 2 or 3 or 4 can be applied, for UE to determine the RB set in which the uplink transmission is performed.

For UE receiving DCI format 0_0 in the USS and the DCI format 0_0 is CRC scrambled with C-RNTI or CS-RNTI or MCS-RNTI, in the DCI format 0_0, the FDRA field should include dedicated bits for RB set indication. The field can contain Y bits, where $$Y = \left\lceil \log_2\left(\frac{N(N+1)}{2}\right) \right\rceil$$

where [ ] is a ceiling operation meaning the smallest integer equal to or greater than $$\log_2\left(\frac{N(N+1)}{2}\right),$$

and N is the number of the RB sets in the active UL BWP. These Y bits are used to indicate the one or more RB sets in the active BWP. The indicated RB sets are for uplink transmission, which takes into account also the intra-cell guard band (GB) between the indicated RB sets and the indicated interlaces, i.e. the uplink resource allocation is determined as an intersection of RBs of the one or more indicated interlaces, the indicated or determined RB sets, and an intra-cell guard band between the indicated or determined RB sets. The advantages of this solution include that flexible control is provided, a BS can control throughout at any time, and Y bits can be least significant Y bits or most significant Y bits in the FDRA field. The UE shall determine the uplink resource allocation as an intersection of the RBs of the indicated interlaces, the indicated or determined RB sets, and the intra-cell guard band between the indicated or determined RB sets.

In some embodiments, the DCI size for DCI format 0_0 in the USS needs to be aligned with the DCI size for DCI format 0_0 in the CSS. This is for the reason of reducing the UE PDCCH monitoring complexity. In this case, the FDRA field of DCI format 0_0 in the USS does not have dedicated bits for RB set indication. Thus, the above-mentioned solution 1 or 2 or 3 or 4 can be applied, for UE to determine the RB set for uplink resource allocation. Preferably, solution 4 is more suitable, because its advantages are suitable for applications with large throughput.

In another example, when UE receives an UL grant scheduled by RAR, the first information is an uplink grant by random access response (RAR). It is used to schedule the initial transmission of Msg3. This information can be received by initial access UE (idle UE) or a connected UE. In RAR uplink grant, there is PUSCH FDRA field, and this field does not have dedicated bits for RB set indication. Thus, the solution 1 or 2 or 3 or 4 can be applied for UE to determine the RB set for uplink resource allocation. Advantages of this example include that high reliability is provided and RAR is suitable for low throughout applications Commercial interests for some embodiments are as follows. 1. providing a method of uplink resource allocation. 2. providing an indication field to include a resource selection indication. 3. providing a good communication performance. 4. providing a high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 18:
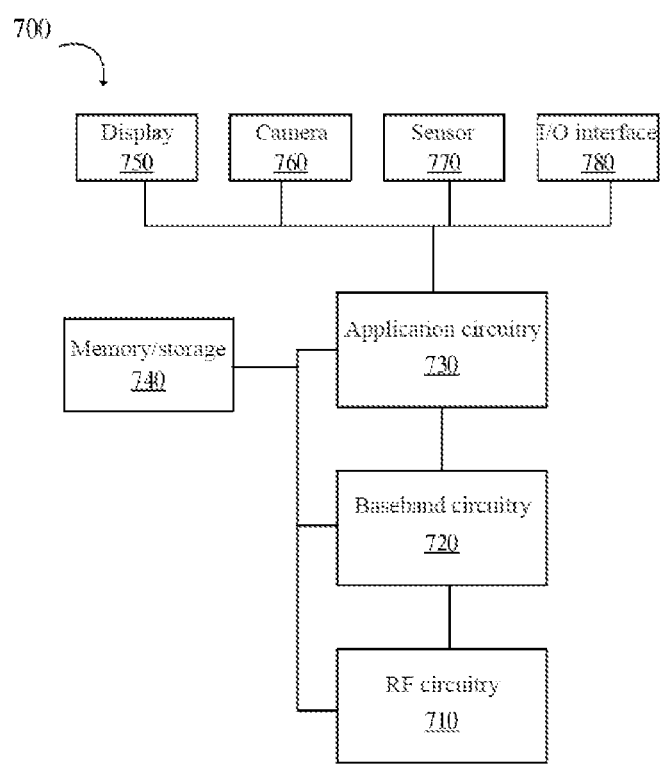
FIG. 18 is a block diagram of a system for wireless communication according to an embodiment of the present disclosure.

FIG. 18 is a block diagram of an example system 700 for wireless communication according to an embodiment of the present disclosure. Embodiments described herein may be implemented into the system using any suitably configured hardware and/or software. FIG. 18 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental states and/or location first information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the state of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method of communication of a user equipment (UE), comprising:
receiving, by the UE, a first information, wherein the first information is relevant to an uplink resource allocation, the uplink resource allocation comprises one or more resource block RB) sets, and the uplink resource allocation comprises one or more interlaces,
wherein the first information corresponds to a downlink control indicator (DCI) format 0_0, the DCI format 0_0 comprises an indication field, and the indication field is a frequency domain resource assignment,
wherein a field of the frequency domain resource assignment has X plus Y bits, most significant X bits are used to indicate one or more interlaces, and least significant Y bits are used to indicate one or more RB sets, X and Y being integers greater than or equal to 1,
wherein the uplink resource allocation is an uplink resource allocation type 2, and the uplink resource allocation type 2 is used when a higher layer parameter, useInterlacePUSCH-Common or useInterlacePUSCH-Dedicated, is set to enabled, and
wherein the uplink resource allocation is determined as an intersection of RBs of the one or more indicated interlaces, the indicated or determined RB sets and an intra-cell guard band between the indicated or determined RB sets.

2. The method of claim 1, wherein at least one of the following applies:
the DCI format 0_0 is in a common search space (CSS);
the DCI format 0_0 is in a UE-specific search space (USS).

3. The method of claim 1, wherein at least one of the following applies:
a field of the frequency domain resource assignment has X bits, and X bits are used to indicate one or more interlaces;
a field of the frequency domain resource assignment has X plus Y bits, X bits are used to indicate one or more interlaces, and Y bits are used to indicate one or more RB sets.

4. The method of claim 3, wherein
in a case that the field of the frequency domain resource assignment has X bits, and the X bits are used to indicate one or more interlaces, then X is equal to 5 when a subcarrier spacing is equal to 15 Khz, or X is equal to 6 when the subcarrier spacing is equal to 30 Khz;
in a case that the field of the frequency domain resource assignment has X plus Y bits, the X bits are used to indicate one or more interlaces, and the Y bits are used to indicate one or more RB sets, then $$Y = \left\lceil \log_2\left(\frac{N(N+1)}{2}\right) \right\rceil \text{ bits,}$$

where N is a number of the RB sets in the initial uplink bandwidth part.

5. A user equipment (UE), comprising:
a memory;
a transceiver; and
a processor coupled to the memory and the transceiver;
wherein the processor is configured to control the transceiver to receive a first information, the first information is relevant to an uplink resource allocation, the uplink resource allocation comprises one or more resource block (RB) sets, and the uplink resource allocation comprises one or more interlaces,
wherein the first information corresponds to a downlink control indicator (DCI) format 0_0, the DCI format 0_0 comprises an indication field, and the indication field is a frequency domain resource assignment,
wherein a field of the frequency domain resource assignment has X plus Y bits, most significant X bits are used to indicate one or more interlaces, and least significant Y bits are used to indicate one or more RB sets, X and Y being integers greater than or equal to 1,
wherein the uplink resource allocation is an uplink resource allocation type 2, and the uplink resource allocation type 2 is used when a higher layer parameter, useInterlacePUSCH-Common or useInterlacePUSCH-Dedicated, is set to enabled, and
wherein the uplink resource allocation is determined as an intersection of RBs of the one or more indicated interlaces, the indicated or determined RB sets and an intra-cell guard band between the indicated or determined RB sets.

6. The UE of claim 5, wherein the one or more RB sets is an RB set with index 0.

7. A method of communication of a base station (BS), comprising:
transmitting, by the BS, a first information, wherein the first information is relevant to an uplink resource allocation, the uplink resource allocation comprises one or more resource block (RB) sets, and the uplink resource allocation comprises one or more interlaces,
wherein the first information corresponds to a downlink control indicator (DCI) format 0_0, the DCI format 0_0 comprises an indication field, and the indication field is a frequency domain resource assignment,
wherein a field of the frequency domain resource assignment has X plus Y bits, most significant X bits are used to indicate interlace, and least significant Y bits are used to indicate one or more RB sets, X and Y being integers greater than or equal to 1,
wherein the uplink resource allocation is an uplink resource allocation type 2, and the uplink resource allocation type 2 is used when a higher layer parameter, useInterlacePUSCH-Common or useInterlacePUSCH-Dedicated, is set to enabled, and
wherein the uplink resource allocation is determined as an intersection of RBs of the one or more indicated interlaces, the indicated or determined RB sets and an intra-cell guard band between the indicated or determined RB sets.

8. The method of claim 7, wherein at least one of the following applies:
the DCI format 0_0 is in a common search space (CSS);
the DCI format 0_0 is in a UE-specific search space (USS).

9. The method of claim 7, wherein at least one of the following applies:
a field of the frequency domain resource assignment has X bits, and X bits are used to indicate one or more interlaces;
a field of the frequency domain resource assignment has X plus Y bits, X bits are used to indicate one or more interlaces, and Y bits are used to indicate one or more RB sets.

10. The method of claim 9, wherein
in a case that the field of the frequency domain resource assignment has X bits, and the X bits are used to indicate one or more interlaces, then X is equal to 5 when a subcarrier spacing is equal to 15 Khz, or X is equal to 6 when the subcarrier spacing is equal to 30 Khz;
in a case that the field of the frequency domain resource assignment has X plus Y bits, the X bits are used to indicate one or more interlaces, and the Y bits are used to indicate one or more RB sets, then $$Y = \left\lceil \log_2\left(\frac{N(N+1)}{2}\right) \right\rceil \text{ bits,}$$

where N is a number of the RB sets in the initial uplink bandwidth part.

11. A base station (BS), comprising:
a memory;
a transceiver; and
a processor coupled to the memory and the transceiver;
wherein the processor is configured to control the transceiver to transmit a first information, the first information is relevant to an uplink resource allocation, the uplink resource allocation comprises one or more resource block (RB) sets, and the uplink resource allocation comprises one or more interlaces,
wherein the first information corresponds to a downlink control indicator (DCI) format 0_0, the DCI format 0_0 comprises an indication field, and the indication field is a frequency domain resource assignment,
wherein a field of the frequency domain resource assignment has X plus Y bits, most significant X bits are used to indicate one or more interlaces, and least significant Y bits are used to indicate one or more RB sets, X and Y being integers greater than or equal to 1,
wherein the uplink resource allocation is an uplink resource allocation type 2, and the uplink resource allocation type 2 is used when a higher layer parameter, useInterlacePUSCH-Common or useInterlacePUSCH-Dedicated, is set to enabled, and
wherein the uplink resource allocation is determined as an intersection of RBs of the one or more indicated interlaces, the indicated or determined RB sets and an intra-cell guard band between the indicated or determined RB sets.

12. The BS of claim 11, wherein the one or more RB sets is an RB set with index 0.

* * * * *